United States Patent [19]
Glimenius et al.

[11] 4,140,806
[45] Feb. 20, 1979

[54] FILTERING METHOD FOR SEPARATING SKIM MILK FROM MILK PRODUCTS

[75] Inventors: Alf R. Glimenius, Handen; Gustav T. Jansson, Tumba; Karl W. H. Kémi, Uttran; Robert M. Sandblom, Farsta, all of Sweden

[73] Assignee: Alfa-Laval AB, Tumba, Sweden

[21] Appl. No.: 652,755

[22] Filed: Jan. 27, 1976

Related U.S. Application Data

[63] Continuation-in-part of Ser. No. 553,641, Feb. 27, 1975, abandoned.

[51] Int. Cl.² .............................................. A23C 9/00
[52] U.S. Cl. ................................... 426/491; 210/23 F
[58] Field of Search .................... 210/23, 23 F, 433 R, 210/321, 433 M, 65; 426/491, 580, 586

[56] References Cited
U.S. PATENT DOCUMENTS

| 3,634,128 | 1/1972 | Bolin ..................................... 210/230 |
| 3,698,559 | 10/1972 | Manjikian ........................ 210/433 M |
| 3,819,742 | 6/1972 | Brun ..................................... 210/230 |

FOREIGN PATENT DOCUMENTS 1-7335  12/1960  Sweden .................................... 426/491

OTHER PUBLICATIONS

Chemical Engineering Progress, vol. 64, No. 12, Dec. 1968, Michaels, "New Separation Technique for the C.P.", 1,31-42.

Porter & Michaels, "Membrane Ultrafiltration", 56 Chem. Tech., Jan. 1971, pp. 56–63, 1.

Lowe, Durkee, Morgan, "A Reverse Osmosis Unit for Food Use", Food Technology, Jul. 1968, 103–105.

Polyelectrolyte Complexes, Alan S. Michaels, Industrial & Engineering Chemistry, Oct. 1965, 32–37.

Reverse Osmosis for Food Processing, Apr. 1968, by Merson, Ginnette, Moran, Dechema-Monographien, 179-201.

*Primary Examiner*—Charles N. Hart
*Assistant Examiner*—Ernest G. Therkorn
*Attorney, Agent, or Firm*—Cyrus S. Hapgood

[57] ABSTRACT

A liquid milk product, such as milk or cream, is caused to flow along the surface of a filter at one side thereof from an inlet of the filter to an outlet thereof at a velocity of 0.5 to 20.0 m/sec., the main quantity of the filter pores each having a diameter of 0.2 to 10 μm. At the same time, skim milk is passed through the filter to the other side thereof under a pressure drop of at least 0.2 kp/cm² while discharging a cream-enriched product from said outlet, and the greater part of this cream-enriched product is returned from said outlet to the inlet of the filter.

2 Claims, 3 Drawing Figures

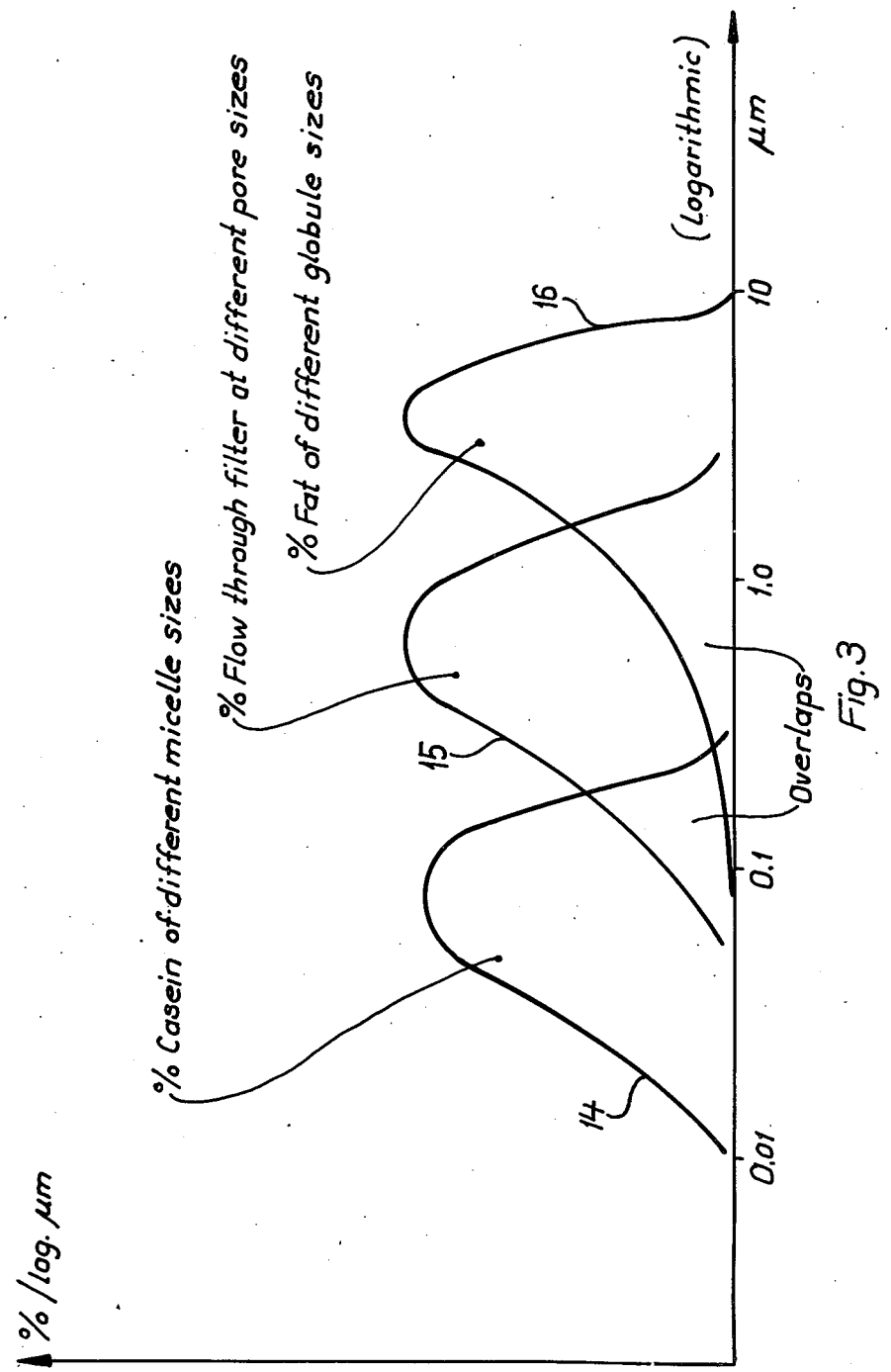

FILTERING METHOD FOR SEPARATING SKIM MILK FROM MILK PRODUCTS

This application is a continuation-in-part of application Ser. No. 553,641 filed Feb. 27, 1975, now abandoned.

The present invention relates to a filtering method for separating skim milk from liquid milk products, especially from whole milk or cream.

Centrifuging has been used for many years for separating liquid milk products. Thus, milk has been centrifuged to recover cream having a varying degree of fat percentage, and cream having a low fat percentage has been centrifuged to concentrate it for the production of butter.

The present invention aims at providing an inexpensive alternative to centrifugal separation of milk or cream. In order for filtering to be practical as an alternative, it is necessary that the throughput capacity of the filter be satisfactorily high. It is known through Swedish Pat. No. 17,335 to separate milk by filtering, but the throughput capacity of the device there disclosed is limited by the capability of the cream to rise to the outlet for the cream under the influence of gravity. This means that the velocity of the milk flow past the filter surface is so low that the filter surface becomes clogged by cream, and the device rapidly becomes incapable of functioning. Obviously this device is not practical for commercial use.

The present invention has for its principal object to provide a separation method based on the filtering principle and which is practical for commercial use. The method is characterized in that the separation of skim milk from milk or cream is carried out by means of a filter in which the main quantity of the filter pores each has a diameter of 0.2–10 $\mu$m (micrometers), that the milk or cream is caused to flow along the filter surface with a velocity of 0.5 to 20 m/sec. from an inlet to an outlet, while skim milk passes through the filter under a pressure drop of at least 0.2 kp/cm$^2$ (kilogram poundal/cm$^2$), and that the greater part of the product, enriched with cream is returned to the filter inlet. In this way, the fat globules in milk or cream are retained by the filter so that they do not pass through it, and they are torn away from the filter surface by the liquid flow sweeping past the latter with sufficient velocity, so that the filter will not be clogged and thereby become incapable of functioning owing to a cream layer adhering to the filter.

The measure kp/cm$^2$ corresponds almost exactly to kg/cm$^2$ (kilograms per square centimeter).

Since the fat droplets and the bacteria of the milk are of the same size magnitude, the skim milk obtained by this method will be substantially free of bacteria, this action being more effective with finer pore size of the filter. When the filtration of the fat droplets is satisfactory, the skim milk will be completely free from bacteria so that it is not necessary to sterilize the skim milk by heating. The latter is an important advantage because heating of the skim milk injures the proteins present in it and also impairs the taste of the skim milk. The present invention also makes it possible to separate off the fat droplets of a milk product more completely than by centrifuging. Thus, it is possible to obtain a skim milk which is even more fat-free than heretofore, such as a skim milk with a fat percentage below 0.05%, if the separation is carried out by means of a filter in which the main quantity of the filter pores has a maximum diameter of 1.0 $\mu$m.

The higher the flow velocity of the milk or cream past the filter surface, the better the latter is kept free from cream deposits. However, the high flow velocity leads to a correspondingly low cream concentration in the product, which has merely swept past the filter surface. In order to avoid excessive recirculation of this product to the filter inlet, this flow velocity should not exceed 20 m/sec.

If it is desired to carry out a separation with a high throughput rate, the milk product can first be separated by means of a filter in which the main quantity of the filter pores has a diameter of at most 10 $\mu$m. A cream is thus obtained which, owing to its great droplet size, is suitable for butter production. Furthermore, a skim milk with a relatively high fat percentage is obtained. This skim milk is then separated by means of a filter having a smaller pore size, thereby obtaining cream separately from a skim milk with a desirably low fat percentage. For the latter separation, a filter may be used in which the main quantity of the filter pores has a diameter of at least 0.2 $\mu$m.

Cream obtained when separating according to the invention and having a fat percentage of 15%, for example, can be concentrated further, by means of repeated separation according to the present method, to a fat percentage such as 50%. The cream thus obtained is suitable for butter production.

The invention is described more in detail below with reference to the accompanying drawings, in which FIG. 1 is a vertical sectional view of a filter device for use in practicing the invention;

FIG. 3 is a schematic representation of the size distributions of fat globules, casein micelles and pores of a commercial submicron filter of the kind used in practicing the invention.

Figure 1:
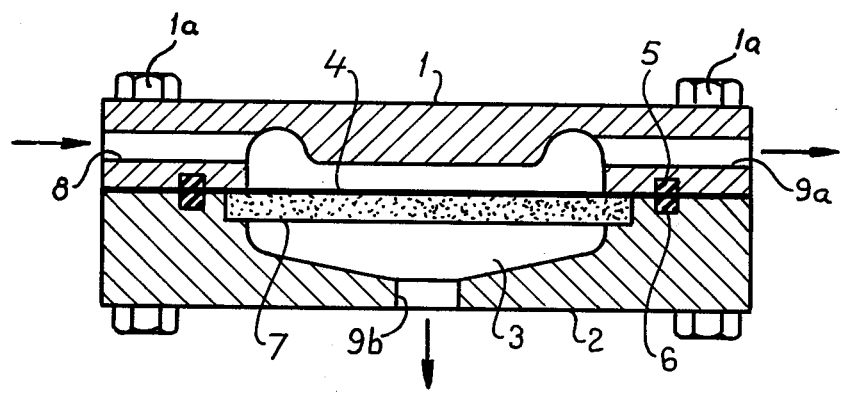

In FIG. 1, two hollowed plates 1 and 2 are kept together by releasable fastening means, such as bolts 1a, and form a hollow space 3 which is preferably of rectangular shape. A diaphragm 4, serving as a filter, is clamped between the plates. This filter, which to advantage can be a diaphragm of porous plastic, is compressed along an annular surface where two annular rubber gaskets 5 and 6 seal the space 3 against leakage along the opposing sides of the plates. The filter 4 is supported against the filtering pressure by a plate 7 of porous material, such as sintered stainless steel. An inlet 8 is provided for supplying a milk product at a temperature of 50° to 55° C, for example, by means of a pump (not shown) generating the necessary filtering pressure. The device is also provided with an outlet 9a for the cream-enriched concentrate and an outlet 9b for the skim milk which has passed through the diaphragm 4.

Figure 2:
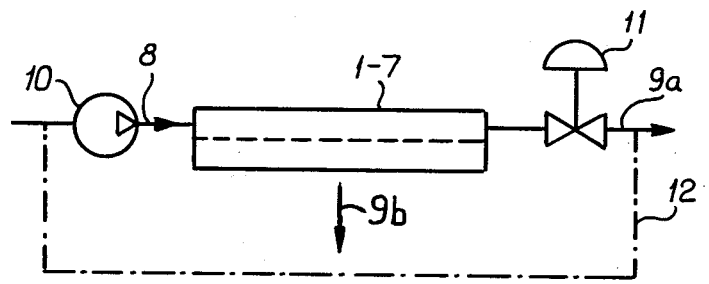
FIG. 2 is a flow diagram in which the filter device is included.

The system shown in FIG. 2 allows the filtering operation to be continued for a long time. The inlet 8 of the device is fed by a pump 10, and the necessary filtering pressure is adjusted by means of a throttle valve 11 inserted in the outlet 9a for the concentrate. In order to attain a desired concentration of the concentrate, a relatively great part of the matter may be returned through a pipeline 12 to the inlet of the pump 10.

In the operation of the device, the milk product to be filtered enters through the inlet 8 and sweeps over the surface of the filter 4 on its way to the outlet 9a. Due to the throttling of the outlet 9a and the pressure thereby generated in the upper part of the space 3, skim milk penetrates through the filter 4 and its support 7 and discharges through the outlet 9b. The pressure drop through the filter is 0.2 to 3 kp/cm², and the velocity of the flow along the filter surface is 0.5 to 20 m/sec.

The liquid milk product separated according to the invention contains butter fat globules in their original (uninjured) form, as in the cases of whole milk and cream.

As previously described, the filtrate obtained according to the invention is skim milk, this being a well known product containing virtually no fat and containing protein in the same concentration as in the whole milk. The protein in skim milk is mainly in the form of a dispersion of casein micelles, which can have a diameter as large as 0.3 μm (page 18 of "The milk fat globule" by Mulder and Walstra, published by Commonwealth Agricultural Bureaux Farnham Royal, Bucks, England, 1974). The fat in the whole milk or other liquid milk product is in the form of an emulsion of fat globules, the smallest of which have a diameter below 0.1 μm (pages 18 and 55 of the above-noted publication authored by Mulder and Walstra). Accordingly, the method of the present invention effects a separation of water-borne particles (emulsion) from other water-borne particles (dispersion).

Referring to FIG. 3, curve 14 shows the percent of casein of different micelle sizes in the milk. As there shown, the micelle sizes vary from about 0.01 to about 0.3 μm, greatest percentage being about 0.1 μm. Curve 15 shows the percentage of flow through the filter (a nominally 0.45 micron commercial membrane filter) occurring at different pore sizes of the filter, the pore sizes as there shown varying mainly from about 0.07 to about 4.0 μm, with the greatest percentage at a pore size of about 0.5 μm (about 70% of the flow is through pores between 0.2 and 1.2 μm). As shown by curve 16, the globule sizes which carry any part worth mentioning of the fat in the milk vary from below 0.1 to about 10 μm, the main part of the fat being contained in fat globules having a size of about 2 to 5 μm. As appears from FIG. 3, the three curves overlap each other at the regions indicated as "Overlaps".

Separation by means of a filter is normally based entirely on difference in size. On this basis, it is apparent from FIG. 3 that use of a filter for separating the milk product would be unsatisfactory, since a substantial proportion of the fat globules are small enough to pass readily through the filter. Thus, the filtrate would not qualify as skim milk, it being understood that the latter contains almost no fat but contains the full casein content of the whole milk. Moreover, calculations show that when whole milk having a fat content of 4% is recirculated past the previously mentioned 0.45 micron membrane filter according to FIG. 2, the filtrate contains at least 0.04% fat by weight, this being considerably greater than the 0.025% of fat in skim milk obtained in dairies by centrifugal separation. Thus, it appears that the results of separating the milk by filtration would be unacceptable.

Surprisingly, however, we have found that despite the apparent inadequacy of filtration for milk separation, the filtration according to the invention takes place in such a manner that all the protein micelles pass through the filter while only a very small part of the fat globules pass through the filter. In fact, by actual test with the commercially available 0.45 micron membrane filter previously mentioned, and recirculating fat-enriched milk with a fat content varying from 4 to 50% past the filter as in FIG. 2, the fat content of the skim milk (filtrate) was about 0.015% by weight during the entire filtration.

Calculations also show that when the same whole milk is recirculated according to FIG. 2 past an ideal 0.45 μm filter, where all pores are 0.45 μm (unobtainable), the skim milk has a fat content of 0.014% by weight, this being in good agreement with the above-noted experimental result. In other words, the practice of the present invention has the effect of transforming the ordinary, commercially-available filter in such a way that it operates as an ideal filter and thus gives a separation which is useful.

The reason for the unexpected result of the invention is not certain but is believed to be related to surface phenomena and the formation of a fat layer on the surface of the filter.

We claim:

1. In the separation of skim milk from liquid milk products containing butter fat globules in their original form, such as milk and cream, with the use of a filter in which the main quantity of the filter pores each has a diameter of 0.2 to 10 μm, the method which comprises causing the milk products to flow along the filter surface on one side of the filter at a velocity of 0.5 to 20 m/sec. from an inlet of the filter to an outlet thereof while passing skim milk through the filter to the other side thereof under a pressure drop of at least 0.2 kp/cm² and while discharging a cream-enriched product from said outlet, and returning the greater part of said cream-enriched product from said outlet to said inlet.

2. The method of claim 1, in which the main quantity of the filter pores each has a maximum diameter of 1.0 μm.

* * * * *